Aug. 21, 1962 E. LORETAN 3,050,350
SHOCK-ABSORBING BEARING FOR THE MOVABLE
ELEMENT OF A SMALL MECHANISM
Filed Feb. 1, 1962
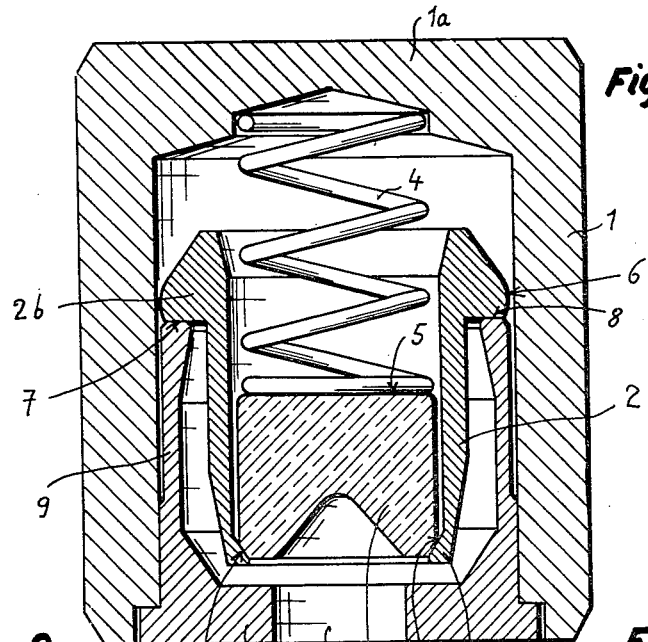
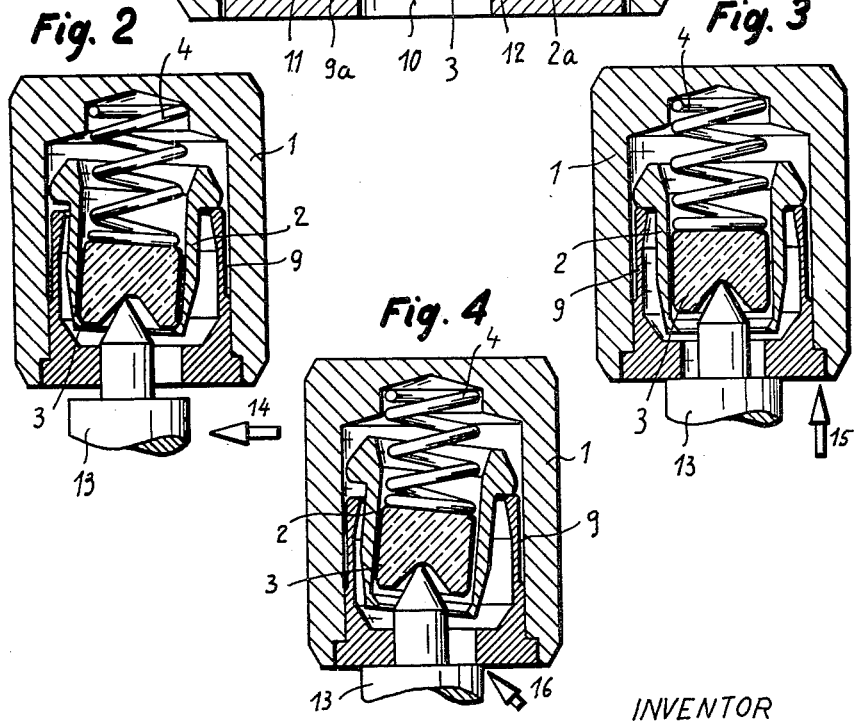
INVENTOR
EDOUARD LORETAN
BY
ATTORNEYS

3,050,350
SHOCK-ABSORBING BEARING FOR THE MOVABLE ELEMENT OF A SMALL MECHANISM
Edouard Loretan, Le Sentier, Canton of Vaud, Switzerland
Filed Feb. 1, 1962, Ser. No. 170,346
Claims priority, application Switzerland Nov. 30, 1961
2 Claims. (Cl. 308—159)

The present invention relates to a shock-absorbing bearing for a moving member in a small mechanism having a pivot bearing, which comprises a bearing support having a recess in which there is disposed in such manner as to be radially displaceable a mount for the pivot bearing, the latter being in turn disposed in the said mount in such manner as to be axially displaceable, and being subjected to the action of a resilient return device which also acts, at least indirectly, on the said mount.

The said bearing is characterised by the fact that the said mount has, at its rear end, an external flange bearing, under the action of the said resilient device, against an internal shoulder with which the said bearing support is formed.

A constructional form of the subject of the invention is illustrated by way of example in the accompanying drawings.

FIGURE 1 is an axial section through a shock-absorbing bearing, and

FIGURES 2, 3 and 4 are axial sections through the same bearing, drawn to a smaller scale, illustrating the movements of the movable parts of the bearing under various shocks to which the shaft may be subjected.

The illustrated bearing comprises a support consisting of a sleeve 1 having a rear end wall 1a intended to be driven into the frame of the device on which the bearing is mounted. The said sleeve encloses a tubular casing 2 serving to receive a pivot bearing 3 and adapted to rock within the sleeve. The pivot bearing is mounted in the casing 2 in such manner as to be able to slide axially, and is maintained against an internal flange 2a at the lower end of the casing 2 by a coiled return spring 4 partially disposed within the casing 2 and bearing at one end against the rear face 5 of the pivot bearing 3 and at the other end against the end wall 1a of the sleeve 1.

The rear end of the casing 2 is formed with an external flange 2b, of which the side face 6 is a segment of a spherical surface serving more especially for guiding the casing 2 when the latter rocks within the sleeve 1. The front face 7 of the said flange 2b rests under the action of the spring 4 against a plane annular surface 8 forming a seating, on the end of a tubular bushing 9 forced, over a part of its length, into the sleeve 1. The end 9a of the said bushing 9 is formed with an aperture 10 for the passage of the shaft, which is not illustrated in FIGURE 1.

In order to widen the manufacturing tolerances, the pivot bearing 3, which consists of ruby, is disposed with slight freedom of axial movement in the casing 2. For centering the said pivot bearing, its forward end is formed with a bearing surface 11 of frustoconical form, which bears against a frustoconical seating 12 formed on the inner face of the flange 2a of the casing 2. It is to be noted that the bearing surface 11 could consist of a segment of a spherical surface having its centre at the base of the recess in the bearing 3.

When the said shaft, which is partially illustrated and denoted by 13 in FIGURES 2 to 4, is subjected to shocks, the pivot bearing 3 can slide axially in the casing 2 constituting its mount and the latter can rock in the sleeve 1 forming the bearing support. Thus, when the shaft 13 undergoes a purely radial shock, for example in the direction of the arrow 14 in FIGURE 2, the casing 2 rocks in the support 1 without any relative movement of the pivot bearing and of the casing. The return spring 4 thereafter returns the casing into the central position. When the shaft 13 undergoes a purely axial shock, for example in the direction of the arrow 15 in FIGURE 3, the casing 2 does not move, but the pivot bearing slides within the casing, and is returned into position by the spring 4. Finally, when the shocks to which the shaft is subjected are both radial and axial, as is most frequently the case, for example in the direction of the arrow 16 in FIGURE 4, the two above-described movements are combined, so that the pivot bearing simultaneously shifts in its mount and rocks in the bearing support.

The invention is not limited to the embodiment described and illustrated. The end 1a of the bearing support may consist of a plug fitted into the said support. The said plug may be externally screwthreaded to enable the bearing to be screwed to a variable distance into the frame of the device on which it is mounted.

The bearing according to the invention is applicable to moving members of devices of small mechanisms, such as measuring instruments and meters, as also to moving members employed in large timepieces, for example in clocks.

What I claim is:

1. In a shock-absorbing bearing for the movable element of a small mechanism, comprising a bearing support provided with an inner recess, a mount consisting of a casing located in the said recess in such manner as to be radially displaceable therein, an external shoulder of the said casing, situated in the neighbourhood of its rear end, an internal ledge of the said casing, a pivot bearing disposed in the said casing in such manner as to be axially displaceable therein, and a resilient return device acting directly on the said pivot bearing for urging it against the said ledge of the said casing, in such a shock-absorbing bearing, an internal shoulder of the said support against which bears the said external shoulder of the casing, under the action of the said resilient return device.

2. In a bearing as claimed in claim 1, the feature that the said internal shoulder of the bearing support consists of the end of a tubular bushing driven into the said support.

References Cited in the file of this patent

UNITED STATES PATENTS 3,026,155    Loretan _____ Mar. 20, 1962